United States Patent Office 2,984,581
Patented May 16, 1961

2,984,581

PROCESS FOR THE PRODUCTION OF CELLULOSE GELS WITH THE AID OF IRON COMPLEXES

Georg Jayme, Darmstadt, Germany, assignor to Firma Carl Freudenberg, Kommanditgesellschaft auf Aktien, Weinheim an der Bergstrasse, Germany No Drawing. Filed Dec. 22, 1958, Ser. No. 781,879

Claims priority, application Germany Feb. 27, 1958

13 Claims. (Cl. 106—163)

The present invention relates to a process for the production of cellulose gels by treatment of cellulose with solutions of iron-tartaric acid-alkali metal-complexes containing an excess of alkali metal hydroxide.

According to Jayme and Verburg (Reyon, Zellwolle und andere Chemiefasern 32, 193, 275 1954), Jayme and Bergmann (Reyon, Zellwolle und andere Chemiefasern 34, 27, 1956, Das Papier 10, 88, 1956, Naturw. 43, 300, 1956, Das Papier 10, 307, 1956) and Jayme and Lang (Kolloid-Zeitschr. 144, 75, 1955), cellulose can be dissolved into gels in iron-tartaric acid-alkali metal-complexes in which the proportion of iron: tartaric acid: alkali metal is 1:1:1 and 1:3:6 which also contain an excess of alkali. Jayme and Verburg produced this type of complex solutions from cellulose in the interest of science and regenerated cellulose therefrom in the form of films or filaments. These experiments were of no technical significance and the further work of Jayme and his collaborators, as a consequence, were exclusively in the direction of scientific viscosity measurements with the aid of the iron-tartaric acid-alkali metal-complexes. The technical application of the alkaline solvents indicated was previously practically precluded because far too great a quantity of solvent was required, that is, the proportion of complex to cellulose required was very large. As tartaric acid is not too easily available in large quantities and is a relatively expensive substance, the commercial feasibility of a cellulose regeneration process, even when tartaric acid is sought to be recovered, depends upon the proportion of the complex to cellulose required in the solution. For example, in an exceptionally favorable instance Jayme and Verburg employed 10 cc. of a solution containing 350 g./liter of complex for 0.50 g. of cellulose which had been degraded to a polymerization degree of 250. This corresponds to a proportion of complex to cellulose of 7:1. Still much larger proportions of complex to cellulose were employed in the viscosity measurements of Jayme and Bergmann.

There have been no lack of attempts to avoid this drawback which is decisive for commercial use of the process. However, previously all such attempts have been unsuccessful.

According to the invention it was, however, unexpectedly found that it is possible to convert celluloses, even those with a much higher degree of polymerization than 250, into gel form with considerably smaller and commercially feasible quantities of complex than was heretofore considered possible.

According to the process of the invention the cellulose is first intimately mixed with a quantity of alkali metal hydroxide solution and of iron-tartaric acid-alkali metal-complex solution insufficient for the immediate formation of a uniform gel, if necessary, permitting the gel to ripen expediently supported by a thorough mechanical kneading of the mass obtained until an especially homogeneous gel is obtained, and then diluting this gel with a further quantity of alkali metal hydroxide solution to provide the desired cellulose concentration.

The process according to the invention depends upon the observation that upon constant kneading of cellulose with relatively small quantities of an alkaline iron-tartaric acid-complex solution, which solution can be relatively concentrated with respect to the complex, and after intimate penetration, a pasty but still rather solid mass is obtained, which can be diluted to produce homogeneous gels with alkali metal hydroxide solutions which have been found to possess high dissolving power for the system in question. In this way only relatively small quantities of complex are employed which are necessary to destroy the native structure of the cellulose so that thereafter a complex free alkali metal hydroxide solution can be used for further dilution. A very considerable saving on complex can be achieved thereby.

The reaction which occurs upon intimate permeation of the cellulose by the complex containing solutions manifests itself in that the mass becomes transparent. This from a scientific point of view evidently can be explained by penetration of the alkali and the complex into the crystalline regions of the cellulose.

The cellulose employed for the process according to the invention can be in native form, as, for example, in cotton, cotton linters and other celluloses or celluloses which have been modified with alkali, acid or in an oxidative manner to provide the desired degree of polymerization. The so-called preripened alkali celluloses which have been produced from cellulose or linters are also well suited for the process according to the invention. Also, regenerated celluloses, such as artificial silk, regenerated cellulose staple fibres and films, can easily be converted into gel form by the process according to the invention.

It is critical for the process according to the invention that a uniform permeation of the cellulose with relatively small quantities of liquid is obtained without having a reaction occur immediately. If, for example, the complex solution added to the mass maintained under constant movement has too high a dissolving power for cellulose, the solution first coming into contact with the cellulose will cause rapid gelatinization and be bound locally so that no solvent, that is, no alkaline complex solution, is available for the remainder of the cellulose. In this instance, non-homogeneous masses containing undissolved fibres and jelly like aggregates are obtained which are of little use.

According to the invention it is also possible to carry out the mixing of the alkaline complex solution with the cellulose in the presence of a portion of the alkali metal hydroxide normally to be added for the dilution.

In addition to using the above mentioned brown 1:1:1 and green 1:3:6 complexes, it has been found particularly advantageous to employ mixtures of these two complexes. Such mixtures have been found to possess a higher dissolving power for most celluloses than either of the complexes individually so that a further saving in complexes is attained. The complex solutions, depending upon the reactivity of the cellulose used, may be previously mixed or also be added separately during the gelatinization. As a consequence, in a preferred embodiment of the process according to the invention the cellulose is intimately mixed with a solution of a mixture of iron-tartaric acid-alkali metal-complex or is intimately sequentially mixed with solutions of such individual complexes.

It has been found especially economical to proceed in such a way that the cellulose is first mixed in the presence of an alkali metal hydroxide solution with an iron-tartaric acid-alkali metal-complex of moderate dissolving power and then adding an iron-tartaric acid-alkali metal-complex of increased dissolving power while intimately mixing the mixture further. This has been found particularly expedient when highly reactive celluloses are treated. Therefore, in such procedure the cellulose is first pretreated with a complex solution of relatively low dissolving power, ideally distributing the solution with continued kneading and then to initiate and complete the gelatinization by the slow addition of another complex solution of a different composition, such second complex solution being such that it possesses a higher dissolving power than the first or, for example, is adjusted to such a concentration that it in combination with the first solution provides a solvent of highest dissolving power. In this way, one is assured that the production of inhomogeneous masses containing larger aggregates is avoided.

Complex solutions in which the proportion of iron to tartaric acid is between 1:1 and 1:3 with up to 6 parts of alkali metal and which contain 100–500 g./liter of complex and an alkali concentration of 1 to 5 n in excess of that required for the complex can be employed with particular advantage in the process according to the invention. Expediently, the proportion by weight of the iron-tartaric acid-alkali metal-complex to cellulose is between about 5:1 and 0.2:1 and preferably is about 1:1. The uniform permeation of cellulose by the alkaline complex solution can be greatly promoted by the addition of small quantities of surface active substances of the type of mercerizing assistants. Such surface active agents primarily are of the type of fatty acid-, fatty alcohol-, alkyl-aralkyl-sulfonates or sulfates, such as, for example, sodium lauryl sulfate, sodium dodecyl benzene sulfonate, sodium alkyl sulfonates containing 14–18 carbon atoms (Mersolates) obtained in the sulfochlorination of paraffin hydrocarbons and subsequent saponification, which are commercially available in large selection.

However, not all wetting agents are equally suited for this purpose. Wetting agents which are as odorless, colorless and alkali stable as possible and which cause no clouding in solution are preferred. The use of wetting agents renders it possible to reduce the proportion of complex to cellulose employed without producing non-uniform masses.

It was furthermore found that additions of certain compounds promoting swelling of cellulose in alkalies substantially increases the dissolving power of the alkaline iron complexes for cellulose. Such compounds, for example, are: urea, thiourea, acetamide, biuret, formamide, dimethylformamide and others.

The quantities of such substances which increase the dissolving power of the alkaline iron complexes, such as wetting agents, swelling agents and the like, required in general either alone or in combination need not exceed 25% calculated upon the weight of the cellulose. Preferably the quantity added is between 5 and 20%. Again it is possible in this way to effect further savings in the complex employed.

The mixing of the cellulose and the alkaline complex solutions is, for example, advantageously carried out by kneading them together in apparatus of the type of the known Werner-Pfleiderer-kneaders in which two Z-shaped scoops rotate in opposite directions at different speeds.

After the gelatinization reaction has occurred it is expedient in most instances not to dilute the resulting mass with alkali metal hydroxide solution immediately, but rather to permit the mass to stand for several hours, or days. A ripening process occurs during such standing, during which the penetration of the cellulose by the small quantity of finely divided complex solution made available is completed, so that the mass assumes a higher homogeneity. An additional kneading before dilution can in some instances also be of advantage.

Aqueous alkali metal hydroxide solutions having a concentration in the range of 1.0 to 5 n are preferably employed for dilution of the ripened pastes. A concentration of 2 n has been found best when the crystalline regions have been completely permeated and the dilution to be effected is only to a concentration of about 5–6% of cellulose. If this is not the case higher alkali metal hydroxide concentrations can be employed. The lower limit of the concentration of the alkali metal hydroxide solution added depends upon the instability of the complexes in very dilute alkaline solutions and is dependent upon the additions, the complex concentration as well as the free alkali metal hydroxide already present.

For example, a solution prepared with the green iron-tartaric acid-sodium-complex having a proportion of complex to cellulose of 3.9:1 and containing 1% of cellulose is unstable as soon as the end sodium hydroxide concentration is below 1.5 n. On the other hand, when the proportion of complex to cellulose is only 3.1:1, the end sodium hydroxide concentration must lie above 2 n in order to provide a stable solution. In instable solutions decomposition of the originally green colored complex takes place after several hours with precipitation of a brown finely divided iron hydroxide.

The toughness of the pastes produced or the viscosity of the diluted gel solutions can be adjusted as desired within wide ranges by selection of a suitable cellulose, the cellulose concentration, and by additions, such as capillary active substances and/or substances increasing the swelling of the cellulose. For example, in general, the concentration of cellulose in a certain cellulose-iron complex gel for the production of foils or filaments can be higher than in one used for bonding fibre fleeces or for improving woven textiles.

It is not necessary, in all instances, that a fully homogeneous glassy transparent mass be produced. For example, for bonding fibre fleeces one can use such small proportions of complex to cellulose that the gel used for such bonding still contains certain quantities of fibres whose surfaces are superficially dissolved and swollen.

In carrying out the process according to the invention it is not necessary that the iron-tartaric acid-alkali metal solution be prepared according to Jayme and Bergmann. For example, complexes can be employed in which the drying of the intermediate precipitated tartrato-ferric acid is avoided and the freshly precipitated acid is directly dissolved in the moist state. Such complex solutions in most instances exhibit a higher dissolving power than those produced from pre-dried tartrato-ferric acid.

In some instances complexes can also be employed in which the intermediate isolation of the tartrato-ferric acid is dispensed with and in which the complex solutions are prepared from an inorganic iron salt, sodium tartrate and aqueous sodium hydroxide. In this instance the solution produced, in addition to the complex, contains foreign ions which somewhat lower the dissolving power of the solution. In some instances, however, where absolutely clear cellulose solutions are not sought after such complex solutions can be used without hesitation. It is also practicable to produce one portion of the complex solution from intermediately precipitated, washed, moist tartrato-ferric acid and the other without intermediate isolation of the tartrato-ferric acid and to employ a mixture of the two for the gelatinization of the cellulose.

It is also possible to employ complexes which are completely or to a great extent formed in the presence of the cellulose at the beginning of or during the gelatinization procedure. This occurs, for example, when fresh precipitated iron hydroxide and caustic soda solution are added to a mixture of cellulose and iron-tartaric acid-alkali metal-complex during the gelatinization. When suitable quantities are added the moist ferric hydroxide goes smoothly into solution during the progress of the dissolution and brown cellulose pastes are produced which are completely clear and transparent in thin layers.

The possibility of using cellulose-iron complex solutions provides a substantial technical advance in many respects. For example, the products produced according to the invention are outstandingly suited for the production of synthetic foils, filaments and the like from cellulose, for bonding of non-woven fleeces of cellulosic fibres of various types and for the treatment and improvement of woven textiles.

One of the most outstanding properties of the finished pastes, gels or gel-solutions is that they have practically unlimited stability when they are stored with protection from the direct sunlight. The cellulose is contained therein as such and not, as in the viscose process, in the form of an unstable compound and furthermore is completely insensitive to oxygen. As is known, in the viscose process, one is forced, in view of the instability of cellulose xanthogenate, to process the viscoses in a very certain very limited instant, as otherwise decomposition of the xanthogenate coupled with coagulation of the cellulose occurs.

The cellulose gels prepared according to the invention, on the other hand, are stable over periods of months and longer and therefore can be processed at any desired time. A further decided advantage over the viscose process is that the solutions according to the invention are completely odorless and do not cause contamination of the air or waste water with evil smelling and poisonous substances and no disturbances to the health of the workers by poisonous gases, such as carbon disulfide and carbo oxysulfide, to which all viscose workers are subjected, can occur.

The cellulose can be easily precipitated from the gels described with coagulating precipitating baths without producing any undesired and disturbing compounds. Suitable precipitating baths may contain organic or inorganic acids such as tartaric or sulphuric acid and salts of the type formed by decomposition of the iron complex and may be applied at temperatures up to e.g. 55° C.

A further advantage of the process according to the invention resides in that it is possible to carry out the gelatinization of cellulose without strong cooling, that is, at room temperature. Of course, the rule in cellulose chemistry that the reaction between cellulose and alkaline solutions is promoted by cooling is also applicable to the process according to the invention. However, when the process is carried out properly, it is not necessary to employ strong cooling. The iron complex solutions employed are stable for a shorter or longer period of time at temperatures up to about 50° C. and higher. At temperatures below 5° C. the cellulose gels assume too high a toughness so that it is preferred but not necessary to operate at temperatures in the range of 10–35° C.

The following specific examples serve to illustrate a number of embodiments of the invention.

The various alkaline complex solutions employed in such examples were prepared as follows:

A. Production of tartrato-ferric acid [(C₄H₂O₆Fe)H] (TF-acid)

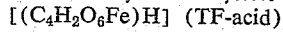

2.5 kg. of iron nitrate, Fe(NO₃)₃.9H₂O, and 1.178 kg. of Na-hydrogen tartrate were each dissolved in 10 liter vessels in about 4 liters of water. An NaOH solution of any desired concentration containing 496 g. NaOH was added to the Na-hydrogen tartrate solution.

Both solutions were heated to 70–80° C. and the nitrate solution added to the tartrate solution with constant stirring. This admixture could not be effected with full incidence of daylight, as the TF-acid produced is sensitive to light. The precipitate produced after thorough mixing was allowed to settle for about 5 minutes in the dark and then filtered off on a suction filter of appropriate size. During such filtration the precipitate was also protected against light. When the filter cake had been sucked almost dry it was washed with about 10 liters of water at 80° C. The wash water was added in small portions. When nitrate reaction was negative in the filtrate, the filter cake was washed 4 times with 1.5 liters of methanol and the water completely displaced from the filter cake. After the last portion of the methanol had been sucked off the suction was continued until the cake was dry and the cake then firmly compressed. During such compression liquid was again produced which also was sucked off.

The yellow brown TF-acid was dried at 50° C.±2° C. After such drying it was no longer sensitive to light and was reduced to a fine powder in a mortar and stored in a bottle having a good ground glass stopper. The yield was about 1000 g.

B. Production of solutions containing the green complex from the preliminarily dried TF-acid (solutions I and II, values for solution II given in parentheses)

The necessary quantities of TF-acid and Na-hydrogen tartrate were weighed out and introduced into 10 liter vessels and converted into a paste by kneading with as small a quantity of water as possible. The quantities of TF-acid were 0.96 kg. (1.54 kg.) and the quantities of Na-hydrogen tartrate were 2.14 kg. (3.12 kg.). The volume of each finished mixture after kneading was less than 5 liters. After the pastes had been formed the mixtures were heated to about 60° C. with good stirring, particularly at the bottom of the vessels. Dark brown thick liquid solutions of the sodium salt of TF-acid (TF–Na) were produced thereby.

The solutions were then cooled to below 20° C. and thereafter a NaOH solution added slowly thereto with intensive stirring so that the temperature did not rise above 25° C. during such addition. The amount of NaOH added was 1.23 kg. (2.46 kg.) in the form of a concentrated solution (about 50%). When the color of the solution changed from brown to green the remainder of the NaOH solution could be added rapidly as only an inconsequential rise in temperature occurs thereafter. Thereafter, sufficient water was added to dilute the solutions to 10 liters with vigorous stirring to effect immediate thorough mixing.

The solutions after their preparation were allowed to stand for 24 hours and then filtered through a G–4 frit. The slight precipitates which occurred after long storage were removed in the same manner.

The concentrations of the solutions produced were as follows:

|  | Solution I | Solution II |
| --- | --- | --- |
| Green complex [Fe(C₄H₃O₆)₃]Na₆ _____ g./l._ | 300 | 480 |
| free NaOH solution _____ n._ | 1.0 | 3.0 |
| free sodium tartrate _____ g./l._ | 35 | 25 |

C. Production of solutions containing green complex using non-predried TF-acid (solution III)

These solutions were produced in such a manner that they contained the same concentration of complex as would be contained in a mixture of equal parts of solutions I and II (390 g./l. of green complex, 2 n free NaOH and 30 g./l. free sodium tartrate).

In the production of 10 liters of solution the following quantities of chemicals were used: 3.75 kg.

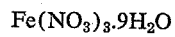

Fe(NO₃)₃.9H₂O 1.76 kg. Na-hydrogen tartrate and 0.75 kg. NaOH.

The dissolution of the chemicals and precipitation of the TF-acid was carried out as under A. After precipitation of the TF-acid and washing with water it was not washed with methanol as under A but the well washed moist filter cake directly placed in a 15 liter vessel and 3.2 kg. Na-hydrogen tartrate added thereto. Under kneading of this mixture it slowly liquified and after several minutes a thin liquid suspension was obtained. This suspension was placed in an ice bath and cooled to 10–12° C. with intensive stirring. Thereafter, 1.85 kg. NaOH in a concentrated solution (about 50%) were added to this suspension, which may not have a volume above 6 liters. The NaOH solution was first added slowly so that the temperature did not rise above 25° C. and after the color changed from brown to green the remainder was added rapidly. The further preparation of solution III is analogous to that of solutions I and II.

D. *Production of solutions containing foreign ions without isolation of TF-acid (solution IV)*

The following quantities of chemicals were employed for the production of 10 liters of this solution containing 390 g./l. of the green complex:

2.425 kg. $Fe(NO_3)_3 \cdot 9H_2O$, 4.142 kg. sodium tartrate.$2H_2O$ and 1.92 kg. NaOH.

The tartrate was suspended in about 4 liters of water in a 15 liter vessel and the iron nitrate dissolved in 1.6 liters of water added to this suspension. The admixture was effected under exclusion of light and with intensive stirring. The stirring was continued until the small quantities of TF-acid precipitated during the admixture were completely redissolved.

The solution was cooled to 10° C. and then the NaOH dissolved in 2 liters of water slowly added thereto so that the temperature did not rise above 20° C. When the color of this solution changed from red brown to yellow green the remainder of the NaOH could be added quickly. 50g. of solid sodium tartrate.$2H_2O$ were added to the resulting solution and it was then diluted with water to 10 liters with good stirring. Before use the solution was permitted to stand for about 24 hours and any small quantities of impurities which had precipitated filtered off with a G-4 frit.

E. *Production of the brown solution of the sodium salt of TF-acid (solution V)*

1.35 kg. of TF-acid prepared as in A were dissolved in 3.5 n NaOH with intensive stirring and then diluted with NaOH of the same concentration to 10 liters. The resulting dark brown solution was immediately ready for use and contained 150 g. TFNa per liter.

F. *Production of complex solutions corresponding to solutions I to V using KOH as the alkali*

The complex solutions containing KOH as alkali were prepared fundamentally in the same manner as indicated under A-E for the preparation of the NaOH containing complex solutions. However, instead of Na-hydrogen tartrate and sodium tartrate, tartaric acid and the corresponding quantity of KOH was employed. The normality of the "free KOH" was the same as given for the NaOH. In order that these solutions possess an optimum dissolving power for cellulose they must be more concentrated than the NaOH containing solutions, namely, they should contain about 480–500 g. of complex per liter rather than about 390 g. per liter.

EXAMPLE 1

1 kg. of cotton linters hydrolytically degraded to a polymerization degree of about 400 were kneaded together with 1170 cc. of solution I and the kneading of the mass continued for 1 hour to render it uniform. Thereafter, 1170 cc. of solution II were slowly dropped into the mass while keeping the mass under constant motion and the mass then again kneaded for a further hour. The temperature was maintained at 20° C. The mass was permitted to stand for 24 hours at room temperature and then 1170 cc. of 3.4 n NaOH slowly dropped in and the mass kneaded for 30 minutes to render it more uniform. After again permitting the mass to stand for 15 hours a further 1170 cc. of 3.4 n NaOH added in the same manner and the mass again kneaded. A total of 10.5 liters of 3.4 n NaOH were added in the above described manner. A clear, transparent, green colored, homogeneous viscid flowing mass resulted which contained 6% of cellulose. The proportion of complex to cellulose was about 0.9:1.

EXAMPLE 2

1 kg. of cotton linters hydrolytically degraded to a polymerization degree of 400 were kneaded together with 1170 cc. of solution I in a Werner-Pfleiderer-kneader and the kneading of the mass continued for about 1 hour to render it uniform. Then 1170 cc. of solution II were dropped in slowly and the mixture again kneaded for 1 hour. After letting the mass stand for 24 hours 1000 g. of freshly precipitated $Fe(OH)_3$ and NaOH in a proportion of $Fe(OH)_3$ to NaOH of 1:6, in the form of 308 g. $Fe(OH)_3$ calculated as dry substance but still in freshly precipitated moist form and 910 cc. of 50% NaOH, were added in increments and after each addition the mass thoroughly kneaded. The temperature was maintained at 10° C. from beginning to end. A homogeneous dark brown mass was produced in which no solid iron hydroxide could be detected. After the mass was permitted to stand for at least 2 days the brown homogeneous mass was diluted with 2.5 n NaOH to a cellulose content of about 5.5% with continuous kneading. The NaOH was added in increments of 1.25 liters each. In all, 11.2 liters of the 2.5 n NaOH were added. After each increment was added the mass was thoroughly kneaded until the newly added NaOH was uniformly distributed and 10 hours were permitted to elapse before the addition of the next increment. The paste produced was homogeneous and brown colored and was just still fluid.

EXAMPLE 3

1 kg. of cotton linters hydrolytically degraded to a polymerization degree of 400 were gelatinized as described in Example 1, except that 3 cc. of a mercerizing assistant (e.g. sultafon 2138, an alkyl sulfate surface active agent) were added per liter to solution I before it was kneaded with the cotton linters. The improved penetration of the cotton linters by the complex solution engendered by such addition rendered it possible to reduce the kneading times and the standing times to about one half.

EXAMPLE 4

1 kg. of cotton linters hydrolytically degraded to a polymerization degree of about 400 was thoroughly kneaded together for 15 minutes with 12 liters of a mixture consisting of 6 liters of solution I and 6 liters of solution II containing 5 cc. of a mercerizing assistant (e.g. sultafon 2138, an alkyl sulfate surface active agent) per liter, and the mixture then allowed to stand for 24 hours. The resultant green paste was subdivided into small pieces and introduced into 87 liters of aqueous 2 n NaOH. This mixture was itensively stirred with a 3000 r.p.m. mixer and within 30 minutes a clear, homogeneous, green gel was obtained in which the cellulose concentration was about 1%. The proportion of complex to cellulose therein was 4.68:1.

EXAMPLE 5

1 kg. of cotton linters hydrolytically degraded to a polymerization degree of about 400 was thoroughly kneaded for 15 minutes with 8 liters of a mixture of 4 liters of solution I and 4 liters of solution II containing 3 cc. of a mercerizing assistant (e.g. sultafon 2138, an alkyl sulfate surface active agent) per liter and 200 g. of urea and the mixture allowed to stand for at least 24 hours at +10° C. The resultant rather solid homogeneous green mass was mechanically subdivided and introduced into 10 liters of aqueous 2 n NaOH. The resultant mixture was intensively stirred with a 3000 r.p.m. mixer until the mass was homogenized and could not be stirred. Thereafter further quantities of 2 n NaOH were slowly added and in each instance stirred as long as possible. In all, 90 liters 2 n NaOH were added in this manner. The product obtained was a clear, green, relatively good flowing gel. The addition of the urea in addition to permitting a saving of complex also provided for a greater stability of the gel produced. The proportion of complex to cellulose in the gel was 3.12:1.

EXAMPLE 6

1 kg. of a rayon cellulose having a polymerization degree of 650 was immersed in an aqueous sodium hydroxide solution containing 225 g. NaOH/l. and then squeezed out to 3.3 times its weight. The alkali cellulose was defibered and subjected to preripening for 24 hours at 20° C. Thereafter it was kneaded for 10 minutes together with 3.57 liters of a 2 n NaOH solution in a Werner-Pfleiderer-kneader to effect homogenization. Thereafter 2.75 liters of solution III were added and the mixture kneaded for a further 30 minutes. Thereafter further 2 n NaOH was added stepwise to the resultant green mass which was not quite homogeneous until a 6% cellulose content was attained. After about 30 minutes' kneading a clear, green paste was obtained in which the proportion of complex to cellulose was 1.07:1.

EXAMPLE 7

The procedure of Example 6 was repeated, except that 250 g. of urea were dissolved in the 2.75 liters of solution III employed. The paste obtained was a little more uniform than that obtained in Example 6 and was of a slightly lighter green color.

EXAMPLE 8

Alkali cellulose prepared from 1 kg. of rayon cellulose and preripened as in Example 6 was thoroughly kneaded together with 8 liters of solution IV. After about 30 minutes' kneading 800 g. of urea dissolved in water were added and the kneading continued. After 24 hours' standing the light green colored paste was diluted to a cellulose content of about 6% by addition of 10 liters of aqueous 3.4 n NaOH while continuously kneading the mixture. A green soft homogeneous paste resulted, the clarity of which was not quite as good as that in a paste obtained under the same conditions which did not contain foreign ions. The proportion of complex to cellulose therein was 3.12:1.

EXAMPLE 9

Alkali cellulose prepared from 1 kg. of rayon cellulose and preripened as in Example 6 was kneaded with 3.57 liters of aqueous 2 n NaOH for 10 minutes to effect homogenization. Thereafter a mixture of 1.5 liters of solution III and 1.25 liters of solution V (150 g. TFNa dissolved in 1 liter of 3.4 n NaOH) was added thereto and the mixture kneaded for a further 30 minutes. The mass was then diluted to a cellulose content of about 6% by addition of 2 n NaOH with continuous kneading. A brown rather homogeneous paste resulted in which the proportion of complex to cellulose was about 0.77:1.

EXAMPLE 10

The procedure of Example 9 was repeated at 25° C., except that 250 g. of urea had been added to the 2.75 liters of mixed complex solution. A somewhat lighter brown colored and somewhat more uniform paste was obtained in a shorter period of time.

EXAMPLE 11

1 kg. of cotton linters hydrolytically degraded to a polymerization grade of about 400 was kneaded together for 30 minutes with 10 liters of a solution containing 480 g. of iron-tartaric acid-potassium complex in which the proportion of iron to tartaric acid to potassium was 1:3:6. The kneaded mixture was then permitted to stand for 24 hours. The resulting rather solid dark green paste was mechanically subdivided and added to 10 liters of an aqueous 2.5 n KOH. The mixture was stirred at 3000 r.p.m. until the mass was homogenized and started to wind itself up on the stirrer. Then small increments of 2.5 n KOH were added and the stirring in each instance continued until the mass started to wind itself up on the stirrer. In all, 89 liters of 2.5 n KOH were added in this manner. A clear, dark green, rather good flowing gel with a cellulose content of about 1% was produced. The proportion of potassium complex to cellulose therein was 4.8:1.

I claim:
1. In a process for the production of cellulose gels in which cellulose is treated with an aqueous solution of an iron-tartaric acid-alkali metal-complex in which the proportions of iron to tartaric acid to alkali metal is 1:1:1 to 1:3:6 containing an excess of alkali metal hydroxide in a concentration of 1 to 5 normal, the steps which comprise first intimately kneading the cellulose together with quantities of alkali metal hydroxide solution and of the iron-tartaric acid-alkali metal-complex solution which are insufficient for the immediate uniform gel formation, the quantity of iron-tartaric acid-alkali metal complex employed being between about 0.7 to 5 parts by weight per part by weight of cellulose, the concentration of the complex in the combination of solutions intimately kneaded together with the cellulose being 100–500 grams per liter and the concentration of the excess of alkali metal hydroxide in such combination of solutions being 1 to 5 normal, and after a particularly uniform gel is obtained diluting such gel to the desired cellulose concentration with further quantities of aqueous alkali metal hydroxide.

2. The process of claim 1 in which said intimate mixture of cellulose and solutions of alkali metal hydroxide and of the iron-tartaric acid-alkali metal compound is permitted to stand to ripen before dilution with the further quantities of alkali metal hydroxide solution.

3. The process of claim 1 in which the intimate mixing with the alkaline complex solution is carried out with a portion of the alkali metal hydroxide solution otherwise employed for the dilution.

4. The process of claim 1 in which the solutions with which the cellulose is first intimately mixed contain a mixture of different iron-tartaric acid-alkali metal-complexes.

5. The process of claim 1 in which the cellulose is first intimately mixed in the presence of the alkali metal hydroxide solution with an iron-tartaric acid-alkali metal-complex having moderate dissolving power for the cellulose and thereafter intimately mixing an iron-tartaric acid-alkali metal-complex of increased dissolving power with such mixture.

6. The process of claim 1 in which the proportion by weight of iron-tartaric acid-alkali metal-complex to cellulose is about 1:1.

7. The process of claim 1 in which said intimate mixing is carried out in the presence of an alkali stable surface active agent selected from the group consisting of fatty acid sulfonates, fatty acid sulfates, fatty alcohol sulfates, alkyl sulfates and aralkyl sulfates.

8. The process of claim 7 in which the quantity of such surface active agent is between 5 and 20% calculated on the weight of the cellulose.

9. The process of claim 1 in which said intimate mixing is carried out in the presence of a compound promoting swelling of cellulose in the presence of alkalies selected from the group consisting of urea, thiourea, acetamide, biuret, formamide and dimethylformamide.

10. The process of claim 9 in which such swelling promoting compound is between 5 and 20% calculated on the weight of the cellulose.

11. The process of claim 1 in which at least a part of the iron-tartaric acid-alkali metal-complex employed is produced in contact with the cellulose.

12. The process of claim 1 in which an alkaline iron-tartaric acid-akali metal-complex solution is employed which was produced directly from moist precipitated tartrato-ferric acid.

13. The process of claim 1 in which an alkaline iron-tartaric acid-alkali metal-complex solution is employed which was directly produced by combining an iron salt, an alkali metal tartrate and aqueous alkali metal hydroxide solution and contains foreign ions derived from the iron salt.

References Cited in the file of this patent

Jayme et al.: Reyon, Zellwolle und andere Chemiefasern 32, 1954, pages 193 and 275.

Jayme et al.: Reyon, Zellwolle und andere Chemiefasern 34, 1956, page 27.